Aug. 12, 1969  B. W. O. DICKINSON III, ET AL  3,460,492
METHOD AND APPARATUS FOR DISPENSING SEEDS COATED
WITH A MAGNETIC MATERIAL
Filed Nov. 7, 1966  6 Sheets-Sheet 1

INVENTORS
Ben Wade Oakes Dickinson III
BY Robert Wayne Dickinson

Attorneys

INVENTORS
Ben Wade Oakes Dickinson III
BY Robert Wayne Dickinson

Attorneys

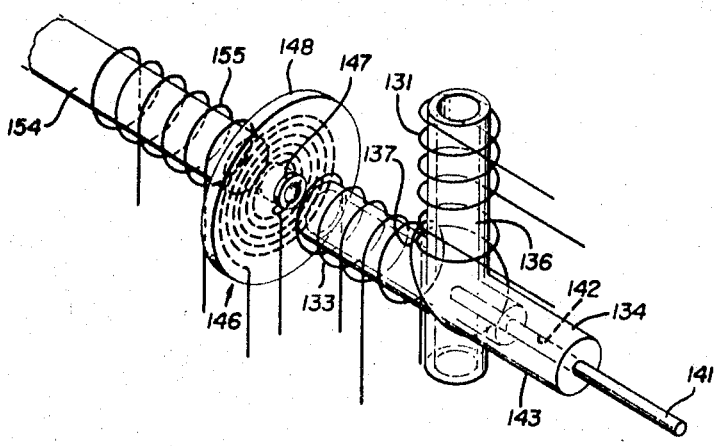

INVENTORS
Ben Wade Oakes Dickinson III
BY Robert Wayne Dickinson

Attorneys

INVENTORS
Ben Wade Oakes Dickinson III
BY Robert Wayne Dickinson
Attorneys

United States Patent Office 3,460,492
Patented Aug. 12, 1969

3,460,492
METHOD AND APPARATUS FOR DISPENSING SEEDS COATED WITH A MAGNETIC MATERIAL
Ben Wade Oakes Dickinson III, 2125 Broderick St., San Francisco, Calif. 94115, and Robert Wayne Dickinson, 40 Maplewood Drive, San Rafael, Calif. 94901
Filed Nov. 7, 1966, Ser. No. 592,654
Int. Cl. A01c 1/04, 1/06
U.S. Cl. 111—1                                    26 Claims

ABSTRACT OF THE DISCLOSURE

Seeds are coated with a thin magnetic coating in such a way to render them capable of being magnetically suspended, moved and placed in an individualized state by interaction with magnetic fields. Apparatus utilizing such fields is provided for metering the seeds and supplying them to a storage belt having magnetic properties which magnetically attract the seeds and hold them at spaced locations. Suitable apparatus is provided for utilizing such a seed loaded belt on farm equipment for removing the seeds from the belt and for precise planting of the seeds.

---

This invention relates to a seed processing method and apparatus, and to a seed product, and more particularly to a method and apparatus for metering or singulating seeds into an individualized state in such a fashion as to facilitate their handling and precise planting. As used herein, singulating includes the terminology singularizing and metering of seeds.

In the processing of seeds for planting as seed crops, bulk seeds are metered for planting as substantially individualized units. Commonly, metering is done in the field with mechanical devices which too often tend to damage the seed or do not accomplish true singularization. In the case of very small oblong seeds, such as lettuce seeds, successful mechanical metering becomes very difficult to achieve. Proposed improvements to such mechanical devices have included pelleting the seeds in a relatively thick coating to place them into a spherical form that is significantly larger and easier to handle than the natural seed. Such pelleted seeds have been subject to poor germination at variable times due to the difficulty of obtaining a precise wetting of the seed in order to break down the coating. Variable germination time spreads out the harvesting time of the plants, directly contributing to harvesting costs.

It is also known to incorporate the seeds at spaced positions on a tape designed to be strung out and planted as a unit in the ground. In this system the tape must decompose in the ground to free the seed and permit germination. Again germination has been erratic due to the hindrance of the tape before decomposition, or to the failure of the tape to decompose. When a crop is planted to a stand and fails to germinate properly, a direct loss results since thinning is not possible. If over planting techniques are used, the advantages of planting to a stand are lost since thinning will be required. There is, therefore, a need for a new and improved seed processing method and apparatus, and seed product.

In general, it is an object of the present invention to provide a seed processing method and apparatus and seed product which will overcome the above disadvantages and limitations.

The present invention proposes coating the seeds with a special thin magnetic coating in such a way as to render them capable of being levitated (i.e., suspended) moved and singularized by interaction with magnetic fields. A belt having magnetic properties is used in conjunction with the magnetic fields to organize and store the seeds in an individualized state. The belt together with the seeds stored thereon is easily folded or coiled for storage and processing of the singularized seeds. The invention further facilitates easy and precise planting of the individualized seeds by providing apparatus suitable for use on field farm equipment for removing the seeds from the belt for precise planting.

A further object of the invention is to provide a seed processing method, product and apparatus of the above character in which the seeds are coated and thereafter processed magnetically but do not require pelleting with a thick coating.

Another object of the invention is to provide a coating method and seed product in which the seeds are given a magnetic coating which permits them to be singularized, stored and handled using magnetic fields.

Another object of the invention is to provide a method and apparatus of the above character which utilizes a magnetic tape or belt capable of retaining a large number of singulated seeds in a compact form for processing and handling the same to reliable germination, the tape being recoverable for reuse when the seeds are planted.

Another object of the invention is to provide a seed processing method, product and apparatus of the above character in which the seeds are germinated and non-destructively tested for germination while stored on the belt.

Another object of the invention is to provide a seed processing method, product, and apparatus of the above character in which non-germinated seeds are removed from the belt and replaced with germinated seeds.

Another object of the invention is to provide a seed processing method, product, and apparatus of the above character in which the germinated and tested seeds are planted to a stand, i.e., planted the same distance apart as desired for the fully mature plant.

Another object of the invention is to provide a seed processing method, product, and apparatus of the above character in which a field planted with coated seeds of the invention can be mapped by a computer to facilitate spot application of fertilizer or other material.

Another object of the invention is to provide a seed processing method, product, and apparatus of the above character which is of general application to all types of seeds, and can be easily and rapidly carried out.

Another object of the invention is to provide an apparatus for processing coated seeds which is relatively simple, having a minimum of moving parts, but is very reliable.

Further objects and features of the invention will appear from the following description in which the preferred embodiment of the invention has been set forth in detail in conjunction with the accompanying drawings.

Referring to the drawings:

FIGURE 7 is a perspective view illustrating a portion of the metering apparatus constructed according to the invention.

FIGURE 8 is an enlarged cross-sectional view of the device of FIGURE 7 together with associated electrical apparatus for making up the metering device, certain parts being shown diagrammatically.

The invention is predicated upon the ability of the magnetic field of suitably constructed magnetic coils to levitate a magnetically coated seed product of the invention by magnetic induction. The seed product is levitated and moved through several such magnetic fields which are organized and timed in such a manner as to cause the coated seed products to become singularized or metered. When singularized, the seed products are released by the final magnetic field and dropped onto a magnetic transport medium which is moving so that the seeds become spaced along the medium. The transport medium preferably takes the form of a magnetic belt which can be coiled or folded into a compact form for storage for processing, the seeds being located at spaced positions along the belt. The magnetic transport medium serves to retain the seeds in spaced individualized state with respect to each other. At a later time the belt is uncoiled or unfolded and moved past suitable magnetic field which separates the seeds one by one from the medium for drop planting the same in the ground.

The coated seed product made in accordance with the present invention takes the form of a seed having a thin coating consisting of a binder adhered to at least certain portions of the seed and a ferromagnetic material dispersed in the binder. The other portions of the seed may remain exposed or the seed may be completely covered.

Figure 1:
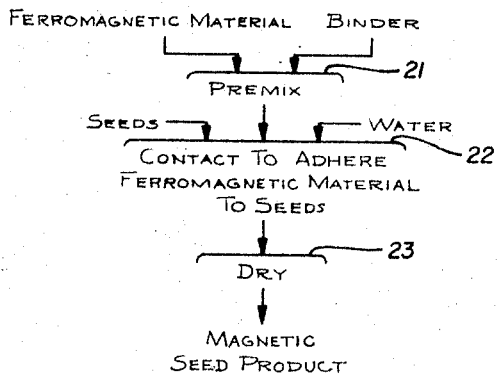
FIGURE 1 is a flow sheet illustrating the general method of coating seeds according to the invention.

The flow sheet of FIGURE 1 generally illustrates the procedure for coating the seeds with a magnetic coating in accordance with the invention. In step 21 water soluble binder and ferromagnetic material are pre-mixed thoroughly to obtain uniform dispersion of the ferromagnetic material in the binder. The pre-mixed binder and ferromagnetic material are then mixed with water and seeds in step 22 until the ferromagnetic material is adhered to the exterior of the seeds in a matrix of binder. The seeds are then dried in step 23 to yield the finished magnetically coated seed product.

Figure 2:
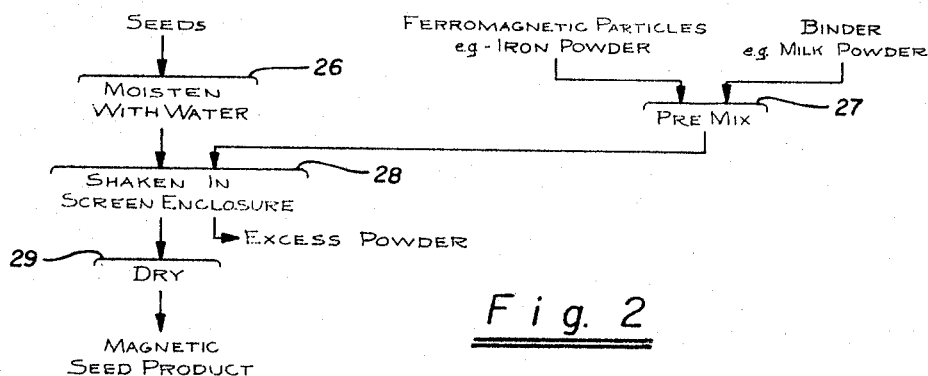
FIGURE 2 is a flow sheet illustrating a particular method for coating seeds according to the invention.

In FIGURE 2 there is shown a flow sheet illustrating one procedure for coating seeds in greater detail, wherein the seeds are moistened with water in step 26. Preferably, the seeds are immersed in a water bath for a period of time long enough to cause the adherence of moisture to the outer coat of the seed but not so long as to cause any significant absorption of moisture by the seed. In this way, premature undesired germination of the seeds is avoided. In small quantities it is found satisfactory to enclose the seeds in a screen of sufficiently fine mesh so that they cannot pass therethrough and to submerge them underwater for a few moments, as for example 30 seconds. Afterwards the screen is removed from the water bath so that the excess water drains off. Ferromagnetic particles and binder in dry form are pre-mixed in step 27 and then poured over the moist seeds and tumbled in step 28. The moist seeds and dry ingredients are shaken together until all the excess ingredients have passed through the screen leaving the seeds with an intermittent or spotted coating of ferromagnetic particles adhered to the seeds in a matrix of binder. Thereafter, the coated seeds are poured out and dried in step 29 on absorbent paper toweling. In the above process the momentary contact of seed and water is only sufficient to permit the seed to take on a surface moisture which serves to dissolve sufficient binder to adhere small agglomerations of spots of binder and ferromagnetic seed. In momentarily contacting the seeds with water, the likelihood of the seed absorbing sufficient moisture to cause germination is minimized and control over germination timing is maintained.

Dry milk powder has been found to be a suitable binder but other water soluble binders may be utilized, provided they are selected to be non-harmful to the seed and its germination. Preferably, non-fat dry milk powder is used, a typical commercial grade, such as supplied by the Carnation Company, being satisfactory. Iron powder is representative of a large number of suitable ferromagnetic materials, one such iron powder being reagent grade supplied by the J. T. Baker & Company under the designation No. 2226 and consisting of iron particles having a size less than about 175 microns. If larger size particles are used, the seeds may become residually magnetized.

All the above described steps of the coating method are preferably carried out at substantially standard temperature and pressure, the temperature being between approximately 50°–70° Fahrenheit. If temperatures outside that range are used, care must be taken that the seeds do not encounter temperatures that reduce the likelihood of germination. Seeds dried at temperatures significantly higher than 70° F. did not germinate.

EXAMPLE I

The following example is an illustration of one specific formula and procedure which has been followed in producing the coated seed product of the invention:

1–2 parts iron powder (Baker No. 2226)
3 parts dry milk powder (Carnation non-fat)
1 part of damp seeds, which have been drained, all parts by volume The powders are mixed well together and poured over the seeds in a conventional strainer having a screen size sufficient to retain the seeds but large enough to pass the excess powder material. The seeds and powder are than shaken together until the seeds attain a coating and the excess powder is passed through the screen. The coated seeds are poured onto a paper towel and spread about to dry, all steps are carried out at room temperature. The seeds thus coated have been found entirely suitable and adaptable to magnetic processing as hereinafter described. Furthermore, samples of seeds so coated have been tested and found to germinate according to substantially the same germination statistics as uncoated seeds, and plants grown therefrom have grown to maturity with no obvious defects.

Figure 4:
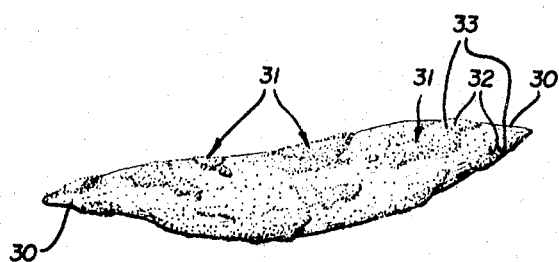
FIGURE 4 is a perspective view of a seed coated according to the invention.

FIGURE 4 depicts a typical seed 30, such as a lettuce seed, coated in accordance with the above process and shows that it is characterized by a thin randomly broken outer coating 31 of magnetic material in the form of spots dispersed about the seed. The coating incorporates particles of ferromagnetic powder 32 in a matrix of binder 33. The other portions of the seed remain exposed so that it is very easy for the seed to later take up the moisture required for germination.

EXAMPLE II

Figure 3:
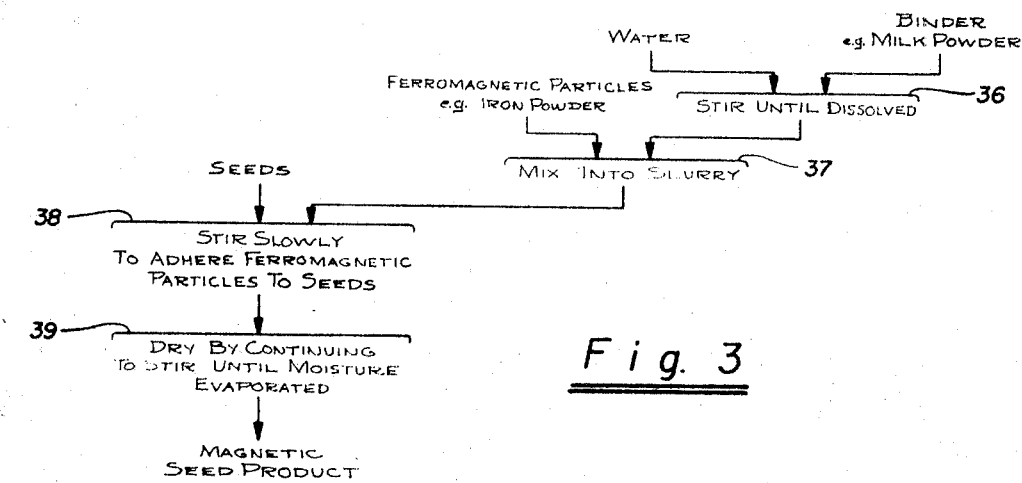
FIGURE 3 is a flow sheet illustrating another particular method for coating seeds according to the invention.

The following is a second example of a formula and procedure suitable for coating the seeds, utilizing a slurry as set forth in the flow sheet of FIGURE 3.

1 part dry milk powder as binder (Carnation non-fat)
½–¾ part iron powder (Baker No. 2226)
1 part seeds, all parts by volume The water and milk powder are stirred until the milk powder is dissolved and the iron powder is added and mixed therewith in step 37 to form a slurry. After the slurry is well mixed, the seeds are added and stirred slowly in step 38 in the slurry and the mixture is dried by continuing to stir until the water therein has mostly evaporated, which takes approximately 15 minutes. The seed produced in this process is very similar to that hereinbefore described in connection with FIGURE 4, but is characterized by having denser population of the spots 31. Nevertheless, the coating remains interrupted, leaving some portions of the exterior of the seed exposed and easily penetratable by moisture.

EXAMPLE III

Figure 5:
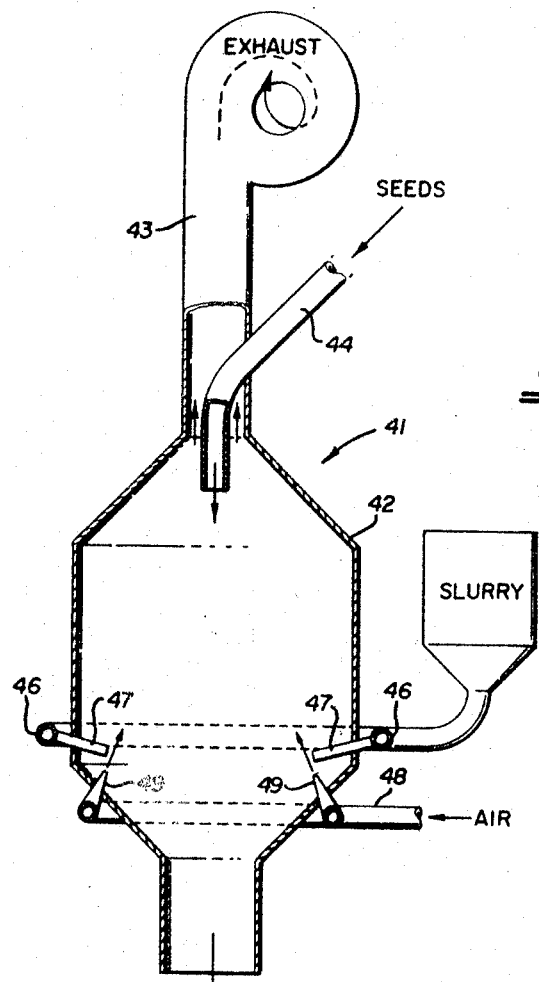
FIGURE 5 is an elevational view partly in section of apparatus for performing a continuous method for coating seeds according to the invention.

This example illustrates a continuous process for coating the seeds and utilizes a slurry and counterflow coating apparatus 41 depicted in FIGURE 5. Apparatus 41 consists of a closed vessel 42 having an air exhaust outlet 43 and seed inlet at its upper end. Milk and iron powders are mixed with water to form a sprayable slurry which is introduced into the apparatus through pipes 46 and ejected through nozzle 47 therein to form a spray. Seeds are fed into apparatus through the inlet 44 and fall through the spray therein under gravity, their rate of descent being controlled by a counter-flow of air supplied through 48 and nozzles 49. After being coated, the seeds exit the apparatus at the bottom through outlet 49 and are conveyed to drying environment by suitable means (not shown).

Seeds coated in the above described manner are characterized by a substantially thin, even coating of iron powder bound to the seed in a matrix of re-solidified dried milk. The coating is very thin and can even take the form of discrete spots, and it is easily penetrated by moisture. The thickness of the coating varies somewhat, but is less than the thickness of the seed itself. Preferably, the coating is less than a few (about 10) thousandths of an inch thick.

Figure 6:
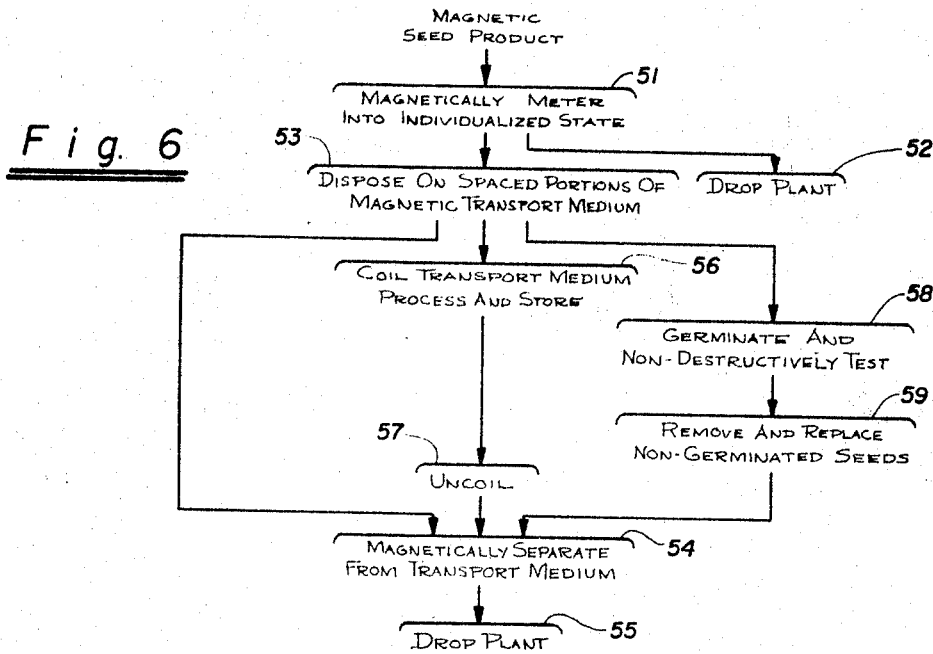
FIGURE 6 is a flow sheet illustrating the general method of processing the seed product of the invention for planting.

Referring to FIGURE 6 there is shown a flow sheet of the process of the invention from the metering step through the planting step. The steps are performed by using primarily magnetic forces. Thus, in step 51 the seed product hereinafter seed product or seed is fed through suitable apparatus (hereinafter described) for magnetically metering the seed products to an individualized state i.e., singularizing them. After being metered the seed products can be directly dropped planted as in step 52 but preferably are deposited on spaced portions of a magnetic transport medium in step 53. The transport medium supports and maintains the seed products in the individualized state. In step 54, the seeds are magnetically separated from the transport medium and drop planted in step 55.

In one form of the invention, the magnetic transport medium takes the form of a tape having a permanent magnetic field associated therewith. After the tape has been loaded with spaced seeds it can be coiled or folded up for subsequent processing and storaging in step 56 and uncoiled in step 57 at such time as the seeds are to be exposed for removal from the tape and planted. Of course, the tape can be uncoiled and recoiled for other intermediate processing steps before planting. Thus, in step 58 the loaded seed tape is placed in an environment conducive of germination and is subsequently non-destructively tested for germination. In step 59 the non-germinated seeds are removed from the tape by suitable apparatus (also hereinafter described) and may be replaced with germinated seeds. By testing and ensuring that each seed used has actually germinated, it is possible to plant such tested seeds at the exact interval desired without the necessity of over planting, thinning etc. as commercially practiced. As will become apparent the thin, light magnetic coating on the seed leaves it nearly naked, so that it can be easily handled by magnetic forces. The thin coating also permits relatively unhindered break out of the root tip during germination as contrasted with pelleted seeds.

Figure 9:
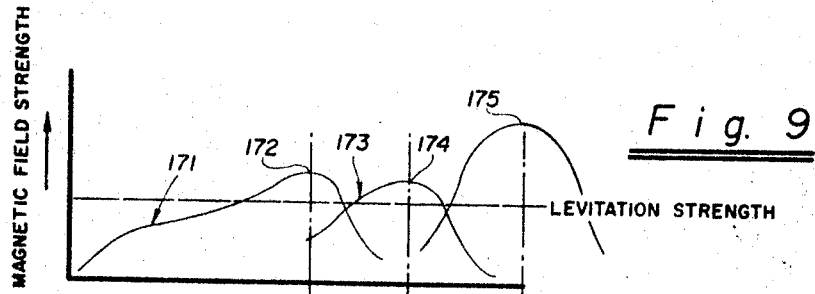
FIGURE 9 is a graph showing the magnetic field strength along line A—A of the singulator of FIGURE 8.

One suitable apparatus for carrying out the metering step 51 is illustrated in FIGURES 7, 8, 9 and consists of a hopper 121 having an opening 123 at its upper end for receiving dry coated seeds 30. A second opening 125 is provided in the lower end of the hopper for permitting a few seeds at a time to fall out under gravity. Thus, opening 125 is made approximately as large as the maximum dimension of the seed being processed. A vibrator 126 is connected to the hopper and includes rotating crank 127 pivotally connected to link 128 by pin 129. The other end of link 128 is pivotally affixed to the hopper so that rotation of crank 127 causes the hopper to vibrate, and to disperse a relatively steady flow of seeds out through opening 125.

Means is disposed below opening 125 to receive the seeds from hopper 121 and for serving as an intermediate source 130 of seeds to later portions of the apparatus. Such means includes coils 131, 132 and 133 which are supported on and surround a tubular member 134 to form an L-shaped solenoid-like magnetic field therethrough. Member 134 is provided with a vertical branch 136 and a horizontal branch 137 which intersect and communicate with each other. Coil 131 surrounding vertical branch 136, coil 133 surrounds horizontal branch 137, and coil 132 surrounds the intersection of branches 136 and 137. Member 134 is made of a non-magnetic material, such as glass, having smooth interior wall surfaces to facilitate easy movement of seeds through the vertical and horizontal branches of the member, as hereinafter explained.

Coils 131, 132, 133 are connected in series to a DC current source 138 through a switch 139 so that the coils 131–133 generate a generally solenoid-like magnetic field which is L-shaped and extends continuously and axially through vertical branch 136 and horizontal branch 137. Coil 133 is provided with a larger number of turns than coils 131 and 132, so that after falling through vertical branch 136 the seeds are attracted by induction into the horizontal branch 137 by the more intense field therein, as generated by coil 133. Coil 131 acts as to slow the descent of the seeds as they fall out of orifice 125 and down vertical branch 136, while coil 132 provides continuity between the magnetic fields in the vertical and horizontal branches. Coils 131, 132, 133 are generally similar to solenoid coils, but are spaced and constructed to allow for certain desirable flux leakage between the coils and between turns within each coil so that the magnetic fields generated therein are not transversely uniform but rather have a maximum value along the mid-point line A—A through the coils.

A non-magnetic rod 141 is mounted for axial movement in a hole 142 passing into the intersection of the branches 136, 137 and is axially aligned with horizontal branch 137. The rod 141 serves as an obstacle for interrupting the fall of seeds momentarily to thereby allow them to be more easily influenced by the magnetic fields within coils 132 and 133. Rod 141 is adjusted so that the tip thereof lies in the path of the falling seeds, the optimum positioning thereof being generally such that the tip of the rod just approaches line A—A. The current supplied to the coils 131–133 and the number of turns of coil 133 are adjusted so that magnetic field generated within coil 133 is sufficiently large that the seeds strike the tip of rod 141 are attracted into horizontal branch 137 and are levitated near its end 144.

Means for forming a magnetic-mechanical grid 146 is positioned in closely spaced relation to the end 144 of branch 137. Grid 146 includes a short section of cylindrical tubing 147 having an orifice 148 therethrough symetrically aligned on line A—A. This dimension is made large enough to selectively pass one seed at a time therethrough as hereinafter explained. A spirally shaped coil 149 surrounds tubing 148 and lies in a plane normal to its axis. Coil 149 is connected through switch 150 to a DC current source which energizes the coil 149 to create magnetic field having a maximum value at orifice 148.

A collecting electromagnet 153 is positioned in spaced relation with respect to grid 146 on the side thereof opposite branch 137. Electromagnet 153 comprises a ferrite core 154 surrounded by a solenoid coil 155 connected to DC current source 151 through switch 156. Ferrite core 154 concentrates the magnetic field generated by coil 155 and provides a seed collecting magnet face 158 in spaced relation adjacent the grid 146 and in general alignment on and transverse to line A—A. When the ferrite core 154 is de-energized it releases the seed immediately since the ferrite core possesses essentially no residual magnetism.

When the seed collected on face 158 is released from the collecting magnet, it is dropped onto a magnetic transport medium which is mounted for relative motion with respect to the seed collecting electron magnet 153 and directly underneath face collecting 158. As shown, the transport medium preferably takes the form of a magnetic belt or tape 161 which is unrolled from a supply spool 162 and re-rolled onto a take up spool 163. Suitable driving means 164 rotates spool 163 to drive the belt 161 in the direction shown. Thus, seeds collected on face 158 and dropped therefrom at spaced time intervals drop onto spaced portions of the belt for retention thereon. The belt 161 is provided with a permanent magnetic field such that the seeds will be attracted and held thereto.

Preferably, tape or belt 161 should possess a residual magnetic field therein transverse to its length dimension and uniformly distributed therealong. One suitable tape has a base constructed of plastic having a thickness of about .030 to .060 inch and is loaded with barium ferrite. This tape is available from B. F. Goodrich Co. under the designation Koroseal 501. The tape is constructed so that the magnetic field is stronger adjacent the top face i.e., surface 165, than the bottom surface 166 so that seeds will not be removed and transferred to adjacent loops of the tape as the same is coiled and uncoiled. To aid in preventing seed transfer or if the tape is not constructed with stronger field on one face, an additional separating layer 167 is uniformly disposed along one side of the tape to further separate successive loops of the tape when it is coiled.

The operation of the metering apparatus shown in FIGURES 7 and 8 is best understood with reference to FIGURE 9 which shows the magnetic field intensity along the imaginary line A—A extending through the apparatus, which line also indicates the path of movement of a particular seed therethrough. Switches 139, 149 and 156 are sequentially closed and opened in series in performing the singulating function. The interval between the closure of one switch and the opening of the next is made quite short, or can even be made to overlap such that a second switch is closed before the first is opened. Graph 171 represents the magnetic field intensity along the path taken by the seed in passing through the apparatus. As shown, the field intensity increases steadily in the region of coil 131 and throughout the intermediate region surrounded by coil 132. Coil 133 produces a definite maximum field 172 in excess of the levitation field for the particular seed which is, in itself, easily derived for experiment. Thus, the seed falls through the region surrounded by coils 131 and 132 and is obstructed by rod 141, and is attracted by and levitated within coil 133. It will be understood that several seeds will generally be attracted within coil 133, so that the latter serves as an intermediate source of seeds for the next portion of the apparatus.

Switch 139 is then opened and simultaneously switch 149 is closed so that a magnetic field is created as indicated by line 173, the field having a maximum 174 at orifice 148 of tubing 147. This magnetic field is strong enough to attract a seed and to pull it into orifice 148. Once a seed lies in the orifice, it excludes other seeds that have also been attracted. Switch 149 is then opened and switch 156 closed to thereby energize collecting magnet 153 and to produce the magnetic field indicated by line 175 (FIGURE 9), the field having sufficient strength to pull the seed out of orifice 148. The opening of switch 149 causes the seeds gathered about the source side of grip 146 to drop into pan 176 which also collects seeds dropped by source 130. Switch 156 is then opened to permit the seed collected on its face 158 to drop onto the moving tape 161, and the cycle of closing and opening switches 139, 149, 156 is repeated. In summary, it may be helpful to consider the metering apparatus as a magnetic triode, intermediate source 130 serving as a seed cathode, grid 146 serving as a seed current limiting device, and collecting magnet 153 serving as an anode.

The line graphs 171, 173 and 175 depicted in FIGURE 9 are shown as overlapping since they represent fields which are time sequenced with respect to each other. While there is shown two direct current sources and several switches which are sequentially operated, as by being so operated by hand, it is entirely obvious that a stepping relay or a computer can be programmed to close and open the switches in the proper sequence. Also, while there is shown and described a series connection of coils 131, 132, 133 to form a single L-shaped solenoid, it is to be understood that each of coils 131, 132, 133 can be connected through separate switches to current source 138, the switches being phased to close and open sequentially to thereby look like a magnetic jack to seeds moving through the apparatus.

The apparatus of FIGURES 7–9 also possesses other advantageous features. In operation, seeds that may become jammed in the orifice grid 146 are pulled back out when coil 133 is subsequently energized so that the apparatus is self-cleaning. When coated elongate seeds are dropped onto tape 61, it is found that they have a strong tendency to align themselves transversely across the tape and generally centered thereon. It is believed that this results from the increased separation of magnetic poles induced into the seed coating when they turn across the tape, and related minimum of potential energy. Seeds tend to become centered because the inducing magnetic field is greater at the center of the tape. To help assure that each seed lies with its length transverse to the tape, the upper seed receiving surface of the tape can be given undulating surface having a sine wave shape and presenting transverse grooves thereon. In this manner, the seeds will be mechanically aided in becoming transversely positioned on the tape since they will be pulled by induction into the groove whereat the magnetic field is greatest.

Figure 10A:
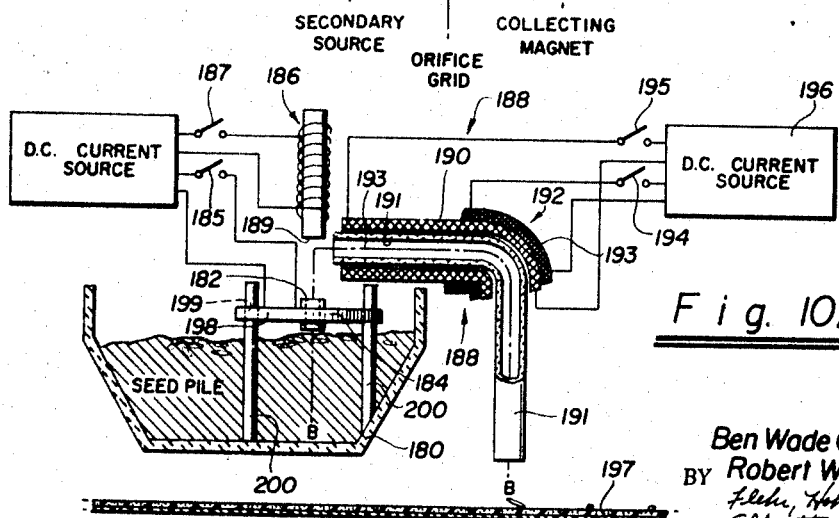
FIGURE 10A is an elevational view partly in section and partly in diagram of another embodiment of metering apparatus constructed according to the invention.
Figure 10B:
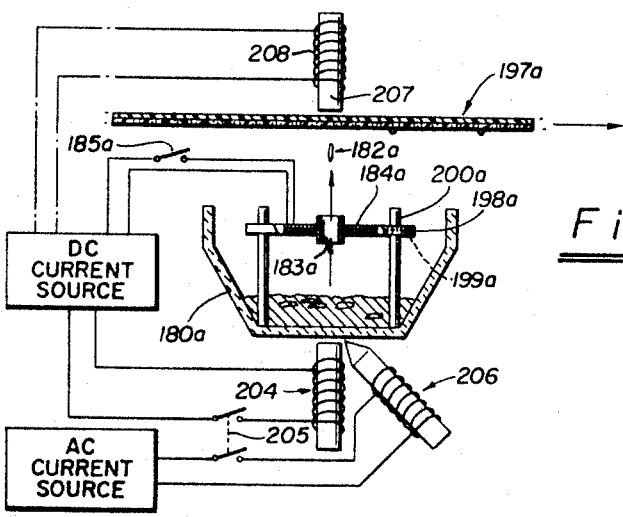
FIGURE 10B is an elevational view partly in section and partly in diagram of still another embodiment of metering apparatus constructed according to the invention which is related to that shown in FIGURE 10A.

FIGURES 10A and 10B illustrate other forms of apparatus suitable for metering seeds utilizing the principles of the invention. The apparatus heretofore described worked in conjunction with gravity by allowing the seed to fall through portions of the apparatus designated as intermediate source. In contrast the apparatus now to be described operates against gravity, which helps keep them from plugging up and avoid recirculating seeds rejected by the singulating process.

Thus, as shown in FIGURE 10A, a vessel 180 serves as source of seeds disposed therein and accessible through an opening 181 in its upper part. A magnetic grid 182 constructed in the same manner as previously described with respect to magnetic grid 146 is disposed horizontally over the opening 181. Thus, grid 182 includes an orifice 183 surrounded by a spiral coil 184 connected through a switch 185 to DC current source. A collecting electromagnet 186 is disposed on the upper side of grid 182 and is connected to the DC current source through switch 187. Collecting magnet 186 is so positioned with respect to orifice 183, that is capable of pulling seed out of the orifice and holding the same in spaced relation thereabove.

A transfer solenoid 188 is horizontally disposed with one end thereof adjacent the collecting face 189 of magnet 186. Solenoid 188 takes the form of a coil 190 wrapped about a section of glass tubing 191 having an elbow 192 and a downwardly extending portion at the end away from magnet 186. An additional coil 193 is provided about elbow 192 to create a more intense magnetic field thereat for attracting the seed along the tubing and to the elbow from which it can be dropped under gravity out of the tubing. Coil 192 is connected through switch 194 and coil 193 is connected through switch 195 to a DC current source 196.

A magnetic transport medium comprising a belt 197 and means for moving the belt relative to the metering apparatus is also provided. Such medium and moving means are the same as that shown and described in connection with the embodiment of FIGURE 8, and are disposed relative to the output end of tubing and below elbow 192 to receive the seeds dropped therefrom. Magnetic grid 182, collecting magnet 186, and transfer solenoid 188 are rigidly connected together by suitable supporting structure (not shown). Magnetic grid 182 includes a flange 198 having holes 199 therein through which pass guides 200 for supporting the grid relative to the seed pile. If desired, the flange can be made to slide along the guides for movement up and down with the seed pile.

Figure 11:
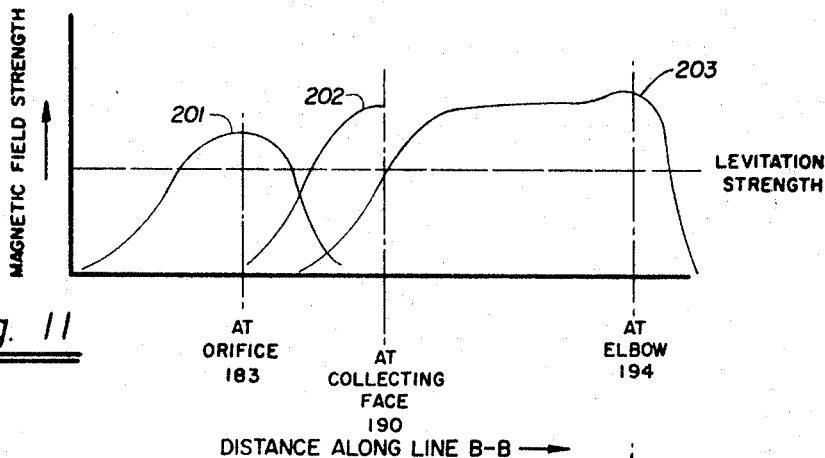
FIGURE 11 is a graph showing the magnetic field strength along line B—B of the metering apparatus of FIGURE 10A.

The operation of the device shown in FIGURE 10A is best understood with reference to FIGURE 11 which shows line graphs 201, 202, 203 of the magnetic field intensity along the imaginary line B—B, also the path of seed movement through the apparatus. Thus, line graph 201 illustrates the magnetic field intensity through orifice 183, the maximum intensity being in excess of the levitation energy or field and occurring in the plane of magnet 182. When energized, magnet 182 serves to lift seeds from the vessel 180 and to levitate one seed within orifice 183. Switch 187 is then closed to energize collecting magnet 186 which lifts the seed upwardly out of orifice 183 and into contact with the collecting face 189 as indicated by line graph 202. As switch 187 is closed, the switch to magnet 182 is opened to release the seed that is held in the orifice 183.

Once the seed is collected at face 189, magnet 186 is de-energized by opening switch 187 and transfer solenoid 188 is simultaneously energized, as indicated by line graph 203 by closing switches 194 and 195 to thereby magnetically pull the seed down the tubing to the elbow 192. The seed is retained there until switches 194 and 195 are opened, after which the seed falls under gravity to belt 197. If desired, switches 194, 195 can be closed and opened in sequence to provide a magnetic jack effect, the seed being first attracted into tubing 191 by coil 190 and then pulled into elbow 192 by the subsequently energized coil 193.

FIGURE 10B shows another embodiment of apparatus for metering seeds which is constructed according to the invention. This apparatus is similar to that shown in FIGURE 10A so that like parts have been given like numbers with the addition of an *a*. Thus, vessel 180*a* is made of a non-ferromagnetic material such as aluminum which permits magnetic fields to pass therethrough. A DC solenoid magnet 204 having a suitable field concentrating core therein is vertically mounted below vessel 180*a* and in general alignment with magnetic grid 182*a*. Solenoid magnet 204 is connected to a DC current source through one set of contacts of a single throw, two-pole switch 205.

An AC solenoid magnet 206 having a field concentrating core therein is positioned adjacent magnet 204 and is connected through the other set of contacts of switch 205 to an AC current source. Magnet 206 is positioned so that its axis makes a substantial angle to the axis of magnet 204 so that the magnetic field lines generated intersect the magnetic field lines of magnet 204 at a substantial angle. As will be seen, when both of magnets 204 and 206 are energized the seeds directly thereabove tend to align themselves in the general direction of the magnetic field lines produced by magnet 204 and to oscillate or vibrate under the influence of the oscillating magnetic field produced by magnet 206.

A magnetic transport medium comprising a belt 197*a* is moved relative to the apparatus and directly over orifice 183*a* of grid magnet 184*a*. A highly permeable bar of material is positioned above belt 197*a* for concentrating the magnetic field of the belt. If desired, bar 207 can possess a permanent magnetic field as by being a ferromagnet or as by being wrapped with a coil 208 connected to the DC current source. Bar 207 cooperates with belt 197*a* to create a seed collecting field at the lower surface of the belt so that seeds approaching the lower surface are positively captured and retained to the belt instead of bouncing away.

The operation of the apparatus shown in FIGURE 10B is as follows. Initially, switch 205 is closed to thereby energize magnets 204 and 206 so that seeds in the pile directly thereabove the magnets are shifted into alignment with the field and agitated. Switch 205 is then opened and switch 185*a* simultaneously closed to create a field within grid magnet 184*a*. The current drawn through the grid magnet is arranged to be very large and of short duration, as for example a narrow, high amperage pulse having a rise time less than a few milliseconds. For example, a suitable pulse could be of the order of 1000 amperes having a duration of 1 millisecond. The pulse is terminated immediately after a substantial amount of the available energy of the field has been imparted to the seed as kinetic energy so that the seed is pulled through the orifice 183*a* and thrown upwardly toward belt 197*a*. The magnetic field created by the bar 207 and belt 197*a* is sufficient to hold the seed in fixed position on the tape. lower surface of the belt so that the seed is momentarily stabilized and held onto the tape. As the tape moves on it carries the seed with it and away from the influence of bar 207. But the residual magnetism of the tape 197*a* is sufficient to hold the seed in fixed position on the tape. Thereafter the above steps are then repeated after the seed tape has advanced a predetermined distance.

Thus, there have been described three embodiments of metering apparatus for magnetically singularizing and transferring seeds to a magnetic belt in such fashion that they separated and retained in an individualized state. If desired, metering steps and apparatus can be arranged on a tractor vehicle or otherwise so that the seeds are not dropped onto a magnetic tape, but are dropped directly onto the ground (as in step 52 of FIGURE 6), such as in furrow planting of seed crops.

The metering apparatus and magnetic belt of the invention also permit the singularizing operation to be carried out as a fixed station operation away from the field. Thus, it can be performed in conjunction with other operations in the processing of seeds. When using the magnetic belt it is convenient to coil it (as by loosely rolling or folding it up) to form a storage and processing carrier for the individualized seeds. Preferably the belt is coiled so that the transverse dimensions of all parts of the belt are aligned in a single direction. When coiled, the seeds are accessible transversely of the belt since the latter is folded along its longitudinal dimension either when rolled or folded and the spaces between belt folds or rolls are accessible from either side of the coiled belt. This configuration is exceptionally useful in that it facilitates carefully controlled storage and processing of the seeds while they are retained to the belt in a compact unit. Accordingly, and by way of example, the coil belt unit can be put into an atmosphere conducive of germination of the seeds. After germination the belt is unwound and a photocell sensitive to green light positioned adjacent the tape for sensing reflected light from root tips that have sprouted in germination. Thus, the output of the photocell is a direct indication of germination of each of the seeds. Whenever a non-germinated seed is found as indicated by lack of sufficient output of the photocell, the non-sprouted seed may be easily removed, and replaced with another seed supplied from a bank of germinated seeds. After non-destructive testing, the belt of germinated seeds is again coiled and then transported to field locations for planting. With such a belt of seeds, it becomes feasable to plant a seed crop to a stand and yet obtain a full yield since each seed has been non-destructively tested for germination and is thus likely to produce a healthy plant. Furthermore, the crop can be planted and grown without thinning or over-planting, as now practiced.

Figure 12:
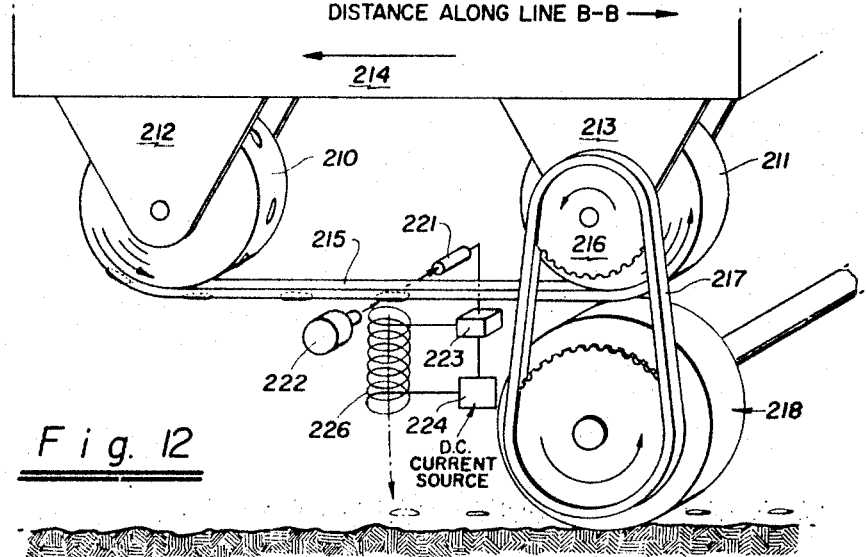
FIGURE 12 is a perspective view partly in diagram of planting apparatus according to the invention.

Referring now to FIGURE 12, there is shown apparatus for performing steps 54, 55 and 57 of the method which are carried out in the field. Thus, there is provided apparatus 208 for unrolling the seed tape and magnetically removing the seeds from the tape for deposit on the ground. Apparatus 208 includes spaced spools 210 and 211 rotatably mounted on brackets 212 and 213 fastened to the under-carriage 214 of a suitable farm vehicle in such a manner as to avoid receiving undue shock. A seed belt 215 is coiled about supply spool 210 and passed to spool 211. Belt 215 is loaded with magnetic spaced seed products that face downwardly for removal as the belt is passed between the spools. A sprocket wheel 216 is connected to spool 211 and is driven by a belt 217 which in turn is driven by suitable means 218 in rolling contact with the ground. Suitable gearing or other means (not shown) is provided for adjusting the relative speeds of means 218 and spool 211.

A photocell 221 adapted to be energized by a light source 222 is mounted across the path of seeds being carried by the belt 215 and operates to turn on a switch 223 whenever a seed blocks the light passing to the photocell. Switch 223 is connected in series with a current source 224 and a solenoid coil 226 to thereby cause the coil to be energized. Coil 226 is positioned vertically between the seed belt directly beneath the point of observation of the photocell 221. Thus, as the tape is advanced and each seed is brought into the light path between photocell 221 and light source 222 the coil is momentarily energized to remove the seed and cause it to drop through the solenoid and onto the ground. Alternatively here and in subsequently described embodiments, capacitive inductive, or fiber optic seed detectors of similar function may be applied.

Figure 13:
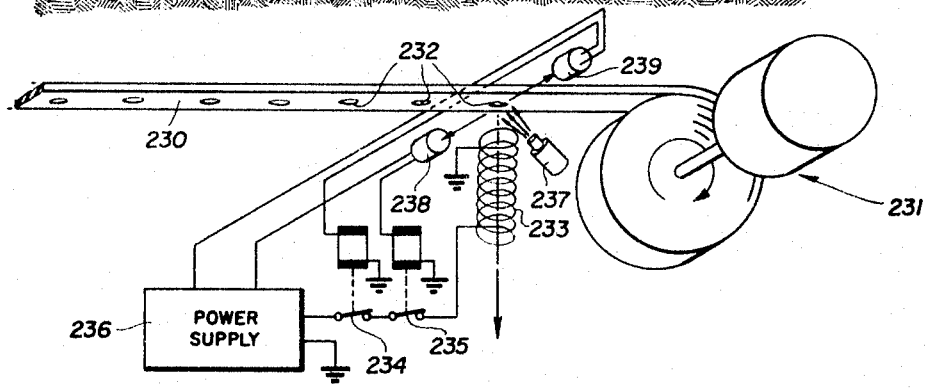
FIGURE 13 is a perspective view partly in diagram of apparatus for nondestructively testing singulated seeds for germination.

FIGURE 13 shows apparatus for carrying out step 58 of the method of FIGURE 6, i.e., for non-destructively testing loaded tape 230 for non-germinated seeds (i.e. seed products). Tape 230 and seeds 232 have previously been exposed to an atmosphere conducive of germination until a significant proportion of the seeds have germinated. Suitable means 231 is used to transport the tape 230 so that a portion thereof is exposed as a single strand transversing fixed location. The seeds carried by the tape are presented to one end of a solenoid coil 233 disposed adjacent the tape and axially directed toward it so that when energized the coil 233 will pull the seed off of the tape 230. Coil 233 is connected in series through normally-closed switches 234, 235 to a suitable power supply 236.

A light source 237 illuminates the tape and seeds passing the fixed location. Since the seeds are aligned transversely of the tapes length, the emerging root tip will usually project generally toward one direction or another transversely of the tape and will reflect some green light in such direction. Green light sensors 238, 239 are located on each side of the tape to receive the light reflected from the seed. When sensors 238, 239 are excited by green light above a certain level, they provide a signal which operates to open one of switches 234, 235.

In operation, the tape is advanced to pass by the fixed location and is illuminated by source 237. Normally closed switches 234, 235 connect coil 233 to supply 236 so that coil 233 will remove seeds unless one of switches 234, 235 is opened. When a seed with emergent root tip is sensed by one of sensors 238, 239, one of the respective switches open the circuit to coil 238 permitting the seed to remain bound to the tape.

Figure 14:
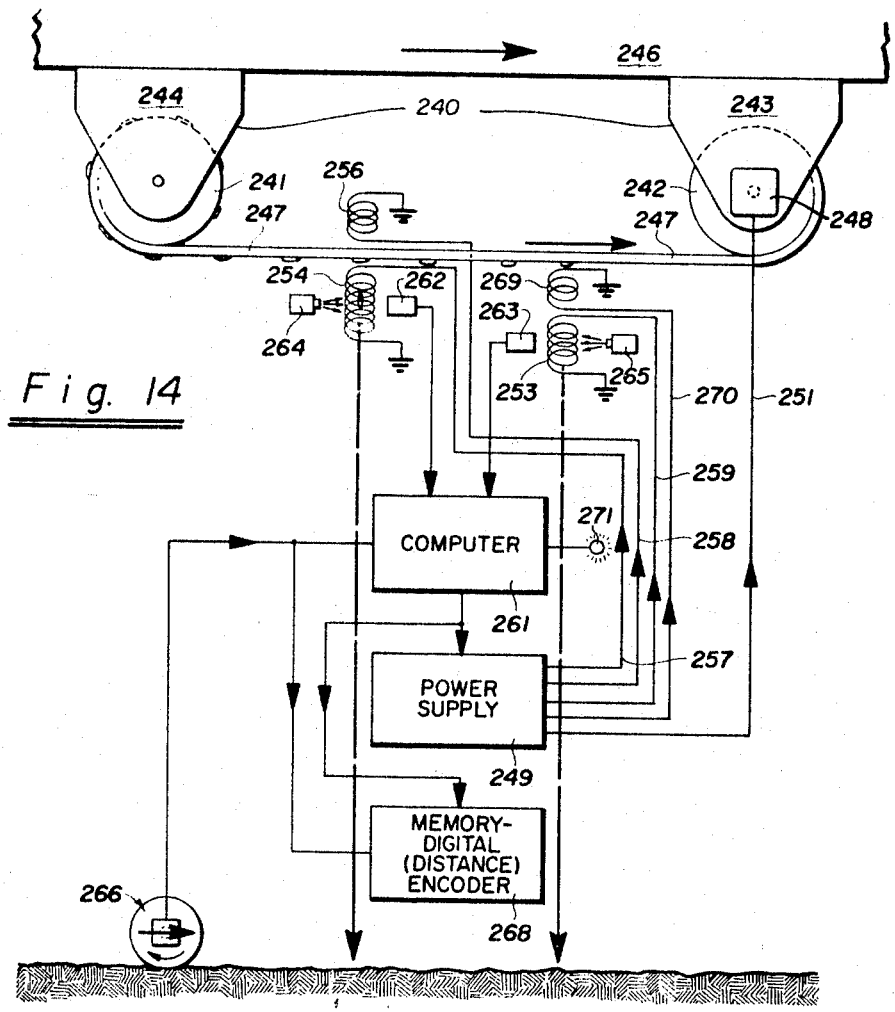
FIGURE 14 is an elevational view partly in diagram of another embodiment of apparatus for planting seeds constructed according to the invention.

FIGURE 14 shows another apparatus for carrying out steps 54, 55, and 57 of the method of FIGURE 6. This apparatus provides assurance that the seed will be dropped each time a plant signal is given. Thus, there is provided a mechanism 240 which unrolls the seed tape and presents the seeds downwardly for magnetic removal and deposit on the ground. Mechanism 240 includes spaced spools 241, 241 rotatably mounted on brackets 243, 244 fastened to the undercarriage 246 of a suitable farm vehicle in such a manner as to avoid receiving undue shock. A seed loaded belt or tape 247 is coiled about supply spool 241 and is passed therefrom and to take-up spool 242 to thereby present a length of tape therebetween on which the seed products carried by the tape are presented downwardly for removal. Spool 242 is driven by a motor 248 to advance the tape during intervals when power is delivered to the motor 248 from a power supply 249 over conductor 251.

Means is provided for removing seeds from the tape and consists of a main solenoid 253 and a buffer solenoid 254. Solenoid 253 is mounted below the tape in a position to remove seeds therefrom next to take-up spool 242. Solenoid 254 is spaced from solenoid 253 and is similarly mounted adjacent spool 241. A third solenoid 256 is provided for nulling out the effect of solenoid 254 and is mounted in axial alignment therewith adjacent the upper side of belt or tape 247 and opposite solenoid 254. Solenoids 253, 254 and 256 are connected to power supply 249 through conductors 257, 258 and 259 respectively.

A computer 261 controls power supply 249 to turn on the one or more of coils 257, 259, as hereinafter described. Computer 261 receives information from photocells 262, 263 mounted adjacent solenoids 254, 253 respectively and capable of sensing a seed therein which seed blocks light normally received by the photocell from light sources 264, 265. Computer 261 also receives ground displacement information from a sensor 266 rolling in contact with the ground. A memory 268 is provided for receiving the output of sensor 266 and the output of computer 261. Memory 268 records the signals from the computer as a function of distance covered. There can also be provided a clearing coil 269 which is connected to the power supply 249 through a conductor 270. Coil 269 is disposed between the tape and coil 253 so that if the latter becomes plugged and fails to clear, coil 269 is turned on.

In operation the apparatus shown in FIGURE 13 works as follows: let it be assumed that the take-up spool 242 is advancing the seed tape but that no seeds have yet been removed into coils 254, 253. Let it further be assumed that coil 256 is off and that coils 253 and 254 are energized. Since no seeds are held by the latter coils, the photocells 262 and 263 indicate the coils to be clear. Computer 261 signals the advance of the seed tape 247 until a seed is pulled into coil 254 by the magnetic field thereof. The seed entering coil 254 blocks photosensor 262 which sends a signal to computer 261. The computer responds by signaling power supply 249 to turn on the coil 256 which nullifies the effect of coil 254 at the tape to permit seeds to pass by coil 254 and not be effected thereby. Coil 254 nevertheless retains the seed previously collected therein which will be a backup or buffer seed to be planted in the event of failure of other parts of the apparatus to effectively plant a seed.

The tape continues to advance and carries the next seed into the vicinity of coil 253 which removes and captures the seed, to block sensor 263 and signals computer 261. The computer responds by signaling the power supply 249 to turn off the power to motor 248 stopping take-up spool 242. The apparatus is now ready for planting, both coils 253 and 254 being loaded with levitated seeds therein.

As the displacement wheel advances sensor 266 supplies an indication of the amount of ground covered. The computer 261 interrogates this distance and continuously compares it with the desired separation of the seeds in the row being planted which separation has been preset into the computer circuitry. When the distance in the total distance indicated becomes equal to that pre-selected distance the computer turns off the power to coil 253 as supplied on conductor 270 which releases the seed held in coil 253 and permits it to drop freely onto the ground. Upon receiving a clear signal from photocell 263, the computer then recycles to cause supply 249 to turn on the take-up spool 242 until another seed is captured within the coil 253 and the blocked condition of the photocell 263 sensed by the computer. In normal operation, this sequence is repeated to plant the row crop.

Should the signal to de-energize the coil 253 fail to produce a clearing of photocell 263, indicative of a seed drop, the computer after a short delay, signals power supply 249 to turn the current to both coils 254 and 256 off, to thereby release the seed in coil 254 for planting. The computer then also orders the power supply 249 to send a current coil 269 to thereby eject the hung-up seed clearing coil 253. At this point the computer returns to its original condition, signaling the power supply 249 to energize coils 253, 254 and motor 248 and to leave coil 256 de-energized. If photocell 262 fails to clear the computer causes light 271 to glow and indicates a malfunction of the system, and probable missed seed placement to the operator.

From the above description and accompanying drawings it will be apparent that the new seed processing method and apparatus and seed product of the invention will be a great value in facilitating the handling and processing of seeds and planting of seed crops. The seed product of the invention is easily and rapidly handled using primarily magnetic fields which is especially advantageous in the processing the small, light weight seeds. Furthermore, the singularized seeds are conveniently stored and accessible on the coiled magnetic tape. This arrangement permits relatively uniform germination of the seeds while so stored, and also non-destructive tested for germination. The seed coating of the invention interfers very little with the germination process so that germination statistics remain as good as uncoated seeds. Since each seed that is satisfactory on test is likely to produce a healthy plant they can be planted to a stand, that is to say, dropped in spaced apart relation along a row at the desired final spacing for the plants. This eliminates the need for conventional over-planting and thinning.

As shown, a memory device can be used to record information concerning the whereabouts of each seed planted by making a record of planting signal versus distance transversed by the planting apparatus, in this way it is possible to fertilize or otherwise spot cultivate the seedling. Furthermore, the thin magnetic coating imparted to the seed remains attached to the cotyledon of the plant even after the plant has begun to grow. During this time it is possible to locate the plant by utilizing a suitable magnetic sensor. Again, spot fertilization and cultivation can be carried out on a crop planted to a stand with consequent savings.

To those skilled in the art to which this invention relates many changes in the procedures and widely differing embodiments and applications of the invention will suggest themselves without departing from the spirit and scope of the invention. Accordingly, it should be understood that the disclosures and descriptions herein are purely illustrative and are not intended to limit the invention, the scope of which is set forth in the appended claims.

We claim:

1. In apparatus for magnetically metering seeds having a magnetic coating, a source of coated seeds, grid means forming an orifice large enough to pass seeds therethrough one at a time, said grid means including means for establishing a magnetic field having a maximum value in said orifice, said field being of sufficient strength to levitate a seed, said grid means being selectively energizable and being disposed sufficiently close to the source of seeds as to be able to remove a seed therefrom and levitate such seed at the orifice, and means disposed on the other side of said orifice for magnetically collecting a seed therefrom.

2. Apparatus as in claim 1 wherein said grid means, source, and collecting means arranged to form a horizontal path for seed movement therethrough and wherein said source includes means for magnetically capturing and levitating a small number of seeds adjacent the orifice said last named means being selectively energizable and cooperating with said collecting means to maintain the grid means free of seeds whenever either said collecting means or said last named means is energized and said grid means is not energized.

3. Apparatus as in claim 1 wherein the source, grid means, and collecting means are arranged to form a vertical path for seed movement so that the seed is pulled through the orifice and to the collecting means against gravity, and wherein said collecting means includes magnetic transfer means for moving a collected seed horizontally away from the grid means.

4. Apparatus as in claim 1 further including a magnetic transport medium for receiving seeds collected and released by said collecting means, and means mounting said transport medium adjacent the collector means for relative motion therebetween.

5. Apparatus as in claim 4 in which said magnetic transport medium comprises an elongate belt including means establishing permanent magnetic field uniformly transversely aligned therealong, said belt being constructed so that the strength of said magnetic field is greater on one face than the other.

6. A medium as in claim 4 wherein said belt consists of a first layer having ferromagnetic properties and a second layer being substantially non-ferromagnetic, so that when the belt is coiled by being spirally wound, adjacent loops present alternate layers to each other to prevent transference of seeds from one loop to the next.

7. Apparatus as in claim 1 wherein the source, grid means, and collecting means are arranged ot form a vertical path for seed movement so that the seed is pulled through the orifice and to the collecting means against gravity, and, wherein said collecting means includes a magnetic transport medium and means for shifting the transport medium relative to the remainder of the apparatus.

8. Apparatus as in claim 1 wherein said source comprises a vessel containing a pile of coated seeds therein and further including means for magnetically vibrating the seeds.

9. Apparatus as in claim 1 wherein the collecting means includes a magnetic transport medium mounted adjacent said grid means for collecting and capturing seeds therefrom, and means for shifting said transport medium relative to said grid means.

10. Apparatus as in claim 9 further including means for concentrating the magnetic field of said transport medium in the vicinity of said grid means so that seeds approaching the medium are positively captured and retained to the medium.

11. In apparatus for planting ferromagnetically coated seeds that are spaced along a magnetic belt, means for supporting and moving said belt past a predetermined location, means for sensing a seed on the belt when it passes the predetermined location, and means responsive to said last named means for magnetically removing a seed off of the belt.

12. Apparatus as in claim 11 in which said means for sensing the seed products includes a light source and a photocell positioned in alignment to form a light path across the path of seed movement so that the light path is intercepted when a seed is present.

13. Apparatus as in claim 11 in which said means for magnetically removing a seed includes a solenoid coil positioned between the belt and the ground, means for selectively energizing said coil to cause the coil to capture or drop a seed.

14. In apparatus for planting ferromagnetically coated seeds from a magnetic tape to which they are individually attached at spaced positions therealong, means for supporting and selectively moving said tape past a predetermined location, first means for removing seeds from the tape including at least one coil for removing seeds from said tape and levitating the same within the coil, means for sensing the presence of a seed within said coil, a power supply, computer means for selectively connecting the coil and the tape moving means to the power supply when the seed is absent, for disconnecting the tape moving means from the power supply when a seed is present, and for disconnecting said coil from the power supply to release the seed upon receiving a predetermined signal.

15. Apparatus as in claim 14 further including a sensor mounted for rolling contact with the ground for supplying a signal to said computer means indicative of the distance moved over the ground, said computer means serving to signal the power supply to disconnect coil and release a seed levitated therein for planting upon determining the distance moved to be equal to a predetermined value.

16. Apparatus as in claim 15 further including a memory for recording the disconnect signals given by the computer as a function of the distance moved.

17. Apparatus as in claim 14 further including a buffer coil for removing a seed from the tape and levitating the same, said buffer coil being connected to the power supply by said computer means, means for sensing the presence of a seed in said buffer coil, means for nulling out the effect of the energized buffer coil at the tape so that a loaded seed tape can pass by said buffer coil uneffected and, wherein said computer means disconnects the power supply from the buffer coil whenever the disconnected first coil fails to clear.

18. A process for magnetically metering seeds having a coating which can be attracted magnetically from a source thereof comprising the steps of repeatedly conveying a plurality of seeds away from said source using magnetic elements for attracting said plurality of seeds, magnetically selecting a single seed from said plurality of seeds, magnetically arranging and affixing a sequence of said single seeds in spaced location along a flexible belt, magnetically removing individual seeds from the belt and dropping said single seeds for furrow planting thereof.

19. A process as in claim 18 further including the steps of coiling said belt into a compact form in which the transverse dimensions of all parts of the belt are aligned and thereafter uncoiling said belt to make seeds available for removal and dropping thereof.

20. A seed belt for storing and handling ferromagnetically coated seeds comprising an elongate belt of flexible material including means forming a permanent residual magnetic field associated therewith which is sufficient to retain said seeds on said belt and a plurality of seeds positioned at spaced locations along said belt and retained thereto by the force of magnetic attractions between the magnetic field of said belt and the coating of said seeds.

21. A seed belt as in claim 20 in which said means forming a permanent magnetic field is arranged so that the magnetic field is stronger adjacent one surface of said belt than the other.

22. A seed belt as in claim 20 in which one surface of said belt is provided with an undulating surface to form transverse grooves thereon for receiving individual seeds.

23. In apparatus for magnetically metering seeds having a coating which can be attracted magnetically, a source of coated seeds, means for repeatedly conveying a plurality of seeds away from said source, said last named means including magnetic elements for attracting said plurality of seeds, means for magnetically selecting a single seed from said plurality of seeds attracted by said magnetic elements, means for removing said single seed from said last named magnetic means, a magnetic belt for receiving each seed from said last named means and for magnetically retaining said seed in the predetermined position thereon, and means for moving said magnetic belt relative to said means for magnetically selecting single seeds.

24. Apparatus as in claim 23 wherein said magnetic elements produce a sufficiently strong magnetic field to levitate seeds and to cause seeds to move upwardly against the force of gravity.

25. In apparatus for magnetically metering seeds having a coating which can be attracted magnetically, a source of coated seeds, means for repeatedly conveying a plurality of seeds away from said source, said last named means including magnetic elements for attracting said plurality of seeds, means for magnetically selecting a single seed from said plurality of seeds attracted by said magnetic elements, means for removing said single seed from said last named magnetic means and a flexible belt including a material having residual magnetic field sufficient to capture magnetically coated seeds, means mounting said belt for movement in relation to said means for removing single seeds so that said single seeds are sequentially transferred to spaced locations along said belt.

26. Apparatus as in claim 25 further including means for non-destructively testing seeds to determine whether they have germinated, comprising an elongate tape containing individualized seeds thereon which have been subjected to an atmosphere conductive of germination, means for passing successive portions of the tape past a given location, means for illuminating the seed bearing portion of the tape at such location, light sensor means mounted to receive reflected light from the tape and seeds at such location, said sensor means being responsive to green light from a root tip on said seed to develop signal indicating the presence of such root tip, a solenoid mounted adjacent such location for removing seeds from the tape, and switch means for selectively connecting and disconnecting the solenoid to a source of power, said switch means being responsive to the signals developed by said sensor means to open said switch means when green light is sensed by the sensor.

References Cited

UNITED STATES PATENTS

| 2,462,276 | 2/1949 | Mueller | 221—233 |
| 2,641,298 | 6/1953 | Kinnear | 47—58 |
| 2,675,942 | 4/1954 | Vogelsang | 47—58 XR |
| 2,828,010 | 3/1958 | Gompper | 209—8 |

FOREIGN PATENTS

| 207,886 | 12/1923 | Great Britain. |
| 621,242 | 4/1949 | Great Britain. |
| 228,264 | 5/1960 | Australia. |

ROBERT E. BAGWILL, Primary Examiner

U.S. Cl. X.R.

47—14, 56, 57; 198—41; 209—8; 221—221, 253